United States Patent

Kristensen et al.

[11] Patent Number: 5,932,830
[45] Date of Patent: Aug. 3, 1999

[54] METHOD FOR ROCKET LAUNCHING

[75] Inventors: Per Herbert Kristensen, Afne Kolsås; Lars Martin Sørhaug, Slemmestad; Bjørn R. Lien, Oslo; Einar Johannessen, Kråkerøy, all of Norway

[73] Assignee: Kvaerner Maritime AS, Lysaker, Norway

[21] Appl. No.: 08/945,504

[22] PCT Filed: Apr. 30, 1996

[86] PCT No.: PCT/NO96/00103

§ 371 Date: Jan. 2, 1998

§ 102(e) Date: Jan. 2, 1998

[87] PCT Pub. No.: WO96/34795

PCT Pub. Date: Nov. 7, 1996

[30] Foreign Application Priority Data

May 2, 1995 [NO] Norway ..................................... 951694

[51] Int. Cl.$^6$ ................................ F41A 9/00; F41F 3/04; B63B 35/40
[52] U.S. Cl. ......................... 89/1.801; 89/1.815; 114/259
[58] Field of Search ............................... 89/1.801, 1.802, 89/1.804, 1.805, 1.809, 1.81, 1.815, 1.8; 114/259, 260

[56] References Cited

U.S. PATENT DOCUMENTS

| | | | |
|---|---|---|---|
| 3,074,321 | 1/1963 | Draim et al. | 89/1.809 |
| 3,284,888 | 11/1966 | McClain et al.1 | 89/1.805 |
| 4,747,334 | 5/1988 | Kuriiwa . | |
| 4,916,999 | 4/1990 | Palmer et al. . | |
| 5,042,358 | 8/1991 | Kuriiwa . | |
| 5,191,162 | 3/1993 | Czimmek . | |

*Primary Examiner*—Charles T. Jordan
*Assistant Examiner*—Theresa M. Wesson
*Attorney, Agent, or Firm*—Birch, Stewart, Kolasch & Birch, LLP

[57] ABSTRACT

A method of assembling, preparing, transporting to a launch site, and launching a rocket is disclosed. The rocket includes multiple stages and a payload to be carried into space. The rocket's longitudinal main axis extends horizontally during the assembling, preparing, and transporting of the rocket. The completed rocket may be transferred from a ship to a floatable structure with the rocket's main axis extending horizontally. The floatable structure can be movable and can raise the rocket prior to launching the rocket into space.

11 Claims, 2 Drawing Sheets

METHOD FOR ROCKET LAUNCHING

BACKGROUND OF THE INVENTION

1. Field of the Invention

The invention concerns a method for assembling, preparing, transporting to the launching site and launching of a rocket, wherein the rocket consists of a plurality of modules and a payload which shall be transported into space.

2. Description of the Related Art

Large rockets for transport of payloads into space consist of several stages which are built separately. The payload, which may be a satellite, is built separately and subsequently transported to the installation site for the rocket where it is assembled therewith.

Large rockets for transport of payloads into space can have a length of 50 meters or more. They are optimized with regard to weight, and are designed in order to withstand substantial loads in their longitudinal direction, while they are only designed to withstand small loads in the transverse direction. Consequently they are not designed to withstand in a horizontal position those forces and bending moments which result from the weight of the completed rocket filled with fuel.

The rockets contain a number of advanced systems, such as mechanical, electrical and optical systems, the assembly of which is complicated, and which demands a comprehensive preparation before launching.

In the prior art assembly, preparation, transport and filling with fuel are performed with the rocket's main axis extending vertically, thus avoiding the said forces and bending moments. The rocket is transported in a vertical position to the launching site, whereupon it is launched.

Assembly and preparation of a rocket in a vertical position required the work to be performed by means of scaffolding or the like which ensures access to the various parts of the rocket. Transport of a large rocket in a vertical position over large distances is virtually impossible, since, in addition to obstacles in the form of bridges etc., such a high structure will be exposed to enormous forces from horizontal accelerations during transport. According to the prior art, assembly and preparation of rockets therefore take place in the immediate vicinity of the site from which the rocket shall be launched.

Due to the earth's rotation the most favorable location for launching rockets is at the equator. However, the assembly and preparation of a large rocket require considerable resources both in the form of expertise and material, and these resources are most available in areas which are not situated at the equator. In practice, therefore, the assembly, preparation and launching of the rocket can take place in an area where the necessary resources are easily available, while forgoing the advantage of launching the rocket from the equator, or the rocket can be launched closer to the equator with the resulting increase in logistic difficulties.

U.S. Pat. No. 4,747,334 describes a floating launching structure for space rockets. The structure is transported to the launching site on a semi-submersible barge-like ship. The ship is submerged and sails away, leaving the structure lying in the water. In this case too, all the time the rocket is standing vertically on the launching platform, this presupposing that it has been assembled in advance.

U.S. Pat. No. 5,042,358 describes a floating launching platform for space rockets. The platform is during the transport to the launch site supported by a semi-submersible barge-like ship, this ship pulling the platform along. The ship is submerged and sails away, leaving the platform lying in the water. In this case too the rocket is standing vertically on the launching platform all the time, this presupposing that it is assembled in advance.

U.S. Pat. No. 4,916,999 describes a jack-up platform for launching rockets. The rocket is assembled vertically on a movable structure at a suitable location on shore. The rocket with the structure is transferred to the jack-up platform, whereupon the platform is transported to the launching site at sea. Here the platform's legs are submerged in such a manner that they are secured on the bottom and form a firm foundation during the launching.

U.S. Pat. No. 5,191,162 describes a method and apparatus for launching at sea a rocket with a satellite or military weapon payload. Two ships are aligned side by side and interconnected with trusses rigidly connecting and holding the ships a predetermined distance apart to form a rocket launcher. A pivotable cradle on a truss connecting the ships' mid-sections is used for raising the rocket to vertical position and supporting the rocket above the sea. Exhaust gases from the rocket at the launch is directed downward into the sea, between the two ships.

The above-mentioned patents thus describe how launching of a rocket can be undertaken from a favorable position, e.g. at the equator, but offer no guidance as to how the rocket can be transported in an advantageous manner, without the drawbacks which are associated with transport of a large rocket with a vertically extending longitudinal axis.

SUMMARY OF THE INVENTION

An object of the invention is to provide a method for assembling, preparing, transporting and launching of rockets with easy access to the resources which are necessary for the assembly and preparation while retaining the advantage of launching the rocket at the equator.

It should be emphasized that the present invention concerns large rockets. Small rockets have a simpler design, are easier both to assemble, prepare and transport, and are not within the scope of the present invention.

In the method according to the invention both assembly, preparation and transporting to the launching site of a rocket, which consists of a plurality of modules and a payload which have to be transported into space, are performed with the rocket's main axis extending horizontally. The problem of large forces and bending moments due to the weight of the fuel is solved partly by the fact that the rocket is resting in one or more specially-adapted cradles or saddles where the weight is distributed in such a manner that the bending moments are reduced, and partly by the fact that a substantial part of the filling of fuel is left until after the rocket has been raised into a vertical position.

The complete rocket, still with the main axis extending horizontally, is then transferred to a floating structure. The floating structure is optionally moved the remaining distance to the launching site, where the rocket is raised to a vertical position and launched.

The assembly, the preparation and possibly the entire transport or a part thereof may take place on board a transport means.

Thus it is possible to transport the rocket in a simple manner, either partially or completely on the transport means, or on the floating structure, to a favourable launching position at the equator.

In a further preferred embodiment the transport means is a ship, and the floating structure is a platform.

In yet another preferred embodiment the ship has at least one covered deck, and the platform is a semi-submersible platform, consisting of horizontal pontoons and vertical shafts with a deck provided on the shafts.

In still another preferred embodiment the ship has room for the assembly, preparation and transport of several rockets simultaneously.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained in more detail by means of one specific embodiment, with reference to the drawings, in which.

DETAILED DESCRIPTION OF THE INVENTION

Figure 1:
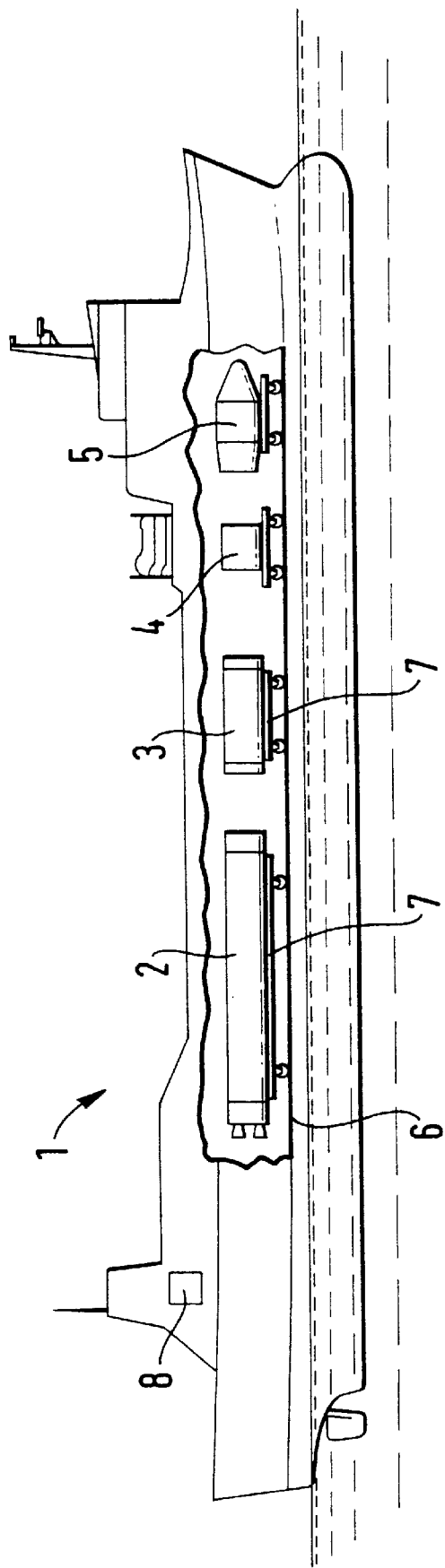
FIG. 1 is a side view of a ship for assembly, preparation and transport of the rocket.

FIG. 1 illustrates a transport means in the form of a ship 1 with a covered deck 6. On the deck there are placed a first rocket stage 2, a second rocket stage 3, a third rocket stage 4 and a payload in the form of a satellite 5. The rocket stages are brought on board the ship via a port in the ship's bow or stem (45 or 55), and then moved to the deck 6 on wheeled trolleys or carriages. The rocket stages are then placed in specially-adapted cradles or saddles 7, which may be integrated with the trolleys or carriages.

The payload, illustrated here as a satellite 5, will normally be brought on board the ship in a different port from the rocket. It can be brought aboard the ship through a hatch in the ship's side or through one of the said ports in the ship's bow or stern 45 or 55. The payload is also placed on a carriage or trolley, and placed in a resting position in a specially-adapted cradle or saddle.

On board the ship the various rocket stages and the satellite are assembled into a rocket whose longitudinal axis extends horizontally. The rocket's technical systems are then prepared by means of equipment which is located on board the ship. The rocket and the satellite are connected via suitable equipment to a control room 8 provided in the ship, thus enabling the rocket and satellite to be monitored from here. It is also possible to fill some of the rocket's fuel, which may be in solid or liquid form, while the rocket is located in the horizontal position in the ship. This must be done, however, with due consideration to the forces and moments to which the rocket is thereby exposed, since the rocket is only designed for limited forces and associated moments across the longitudinal direction.

After the assembly of the rocket is complete, it is transferred to a platform via the port in the ship's bow or stern (45 or 55). The rocket with its saddles is moved out through the port by means of a wheeled system, which may run on rails, to a lifting ramp, and is lifted over to the platform, which process will be explained in more detail with reference to FIG. 2.

Figure 2:
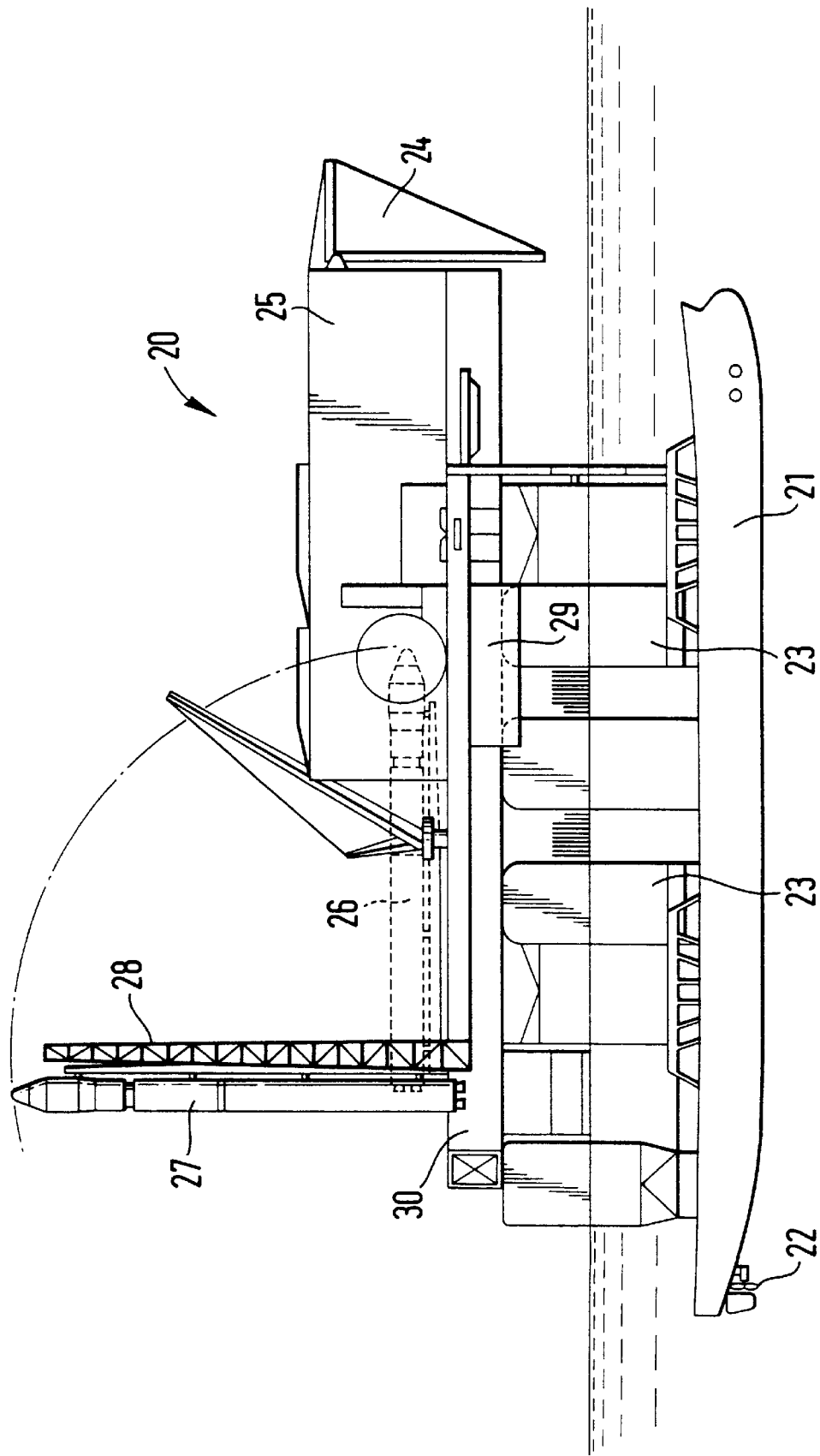
FIG. 2 is a side view of a platform for launching the rocket.

FIG. 2 illustrates a floating structure in the form of a semi-submersible platform 20. The platform's main components consist of horizontal pontoons 21 with propulsion propellers 22, driven by the platform's own machinery. On the pontoons 21 there are provided vertical shafts 23, on which there rests a deck 29. The platform is equipped with a hoisting device 24 and a hangar 25.

When the rocket is transferred from the ship to the platform, the rocket is moved as described above out through a port in the ship to a lifting ramp. It is then lifted on board the platform in a horizontal position by means of the hoisting device 24, and is brought into the hangar 25 which is equipped with the necessary equipment to continue the preparation if required. The rocket is monitored all the time from the ship's control room 8. With the exception of the control room for the rocket, the platform has all the means necessary for completing the preparation of the rocket.

Before launching, the rocket is moved out of the hangar by means of a transport system, which preferably runs on rails, to a position illustrated by dotted lines 26, and over to a launching ramp 30. The launching structure is located on one of the platform's sides, preferably the platform's stern, where the platform's stern is the end which is naturally located at the back during a move. At the launching ramp, on the side which faces the platform, there is a flame shield or similar device (not shown) in order to protect the platform from flames and heat from the launch.

The rocket is raised to a vertical position as indicated by the reference numeral 27 by means of a tilting/hoisting device 28. By this time most of the platform personnel have left the platform. This can be done via a gangway or ladder between the platform and the ship. The gangway is then removed and the ship moved to a safe distance from the platform, e.g. 2000 m, in order to continue the monitoring of the launch.

After the rocket has reached its vertical position, the final preparations are performed, including, e.g., the final fuel filling, where the rocket is filled from containers which are located on the platform. The amount of fuel which is filled in this final phase is, as mentioned, dependent on the extent of the load which the rocket can withstand across the longitudinal axis. As a minimum, this final fuel filling will comprise filling of liquid oxygen, since liquid oxygen evaporates rapidly at normal ambient temperatures.

After this final preparation the last platform personnel are transferred from the platform to the ship via boat or helicopter.

The actual launch is controlled from the ship's control room. After the rocket has risen some distance into the atmosphere, a land-based station takes over control.

The ship, and possibly the platform, then return to their port.

Thus the said object is achieved by having both easy access to the necessary personnel and materials during the launch, while at the same time allowing the launch to be conducted at the equator.

Compared with the known solutions mentioned in the introduction, in which it is proposed to launch rockets from platforms, the horizontal handling and storage of the rocket provide a number of advantages. Firstly, transport becomes much simpler and cheaper, since it is possible to use a ship with "normal" dimensions. In fact it is possible to convert an already existing ship, e.g. a Roll-on/Roll-off cargo ship. Furthermore, far better protection is obtained with regard to horizontal transport accelerations, since the forces which result from these accelerations do obtain virtually no moment arm when the rocket is transported horizontally. In addition the superstructure and access to the various parts of the rocket become far less expensive, thus ensuring that the assembly, preparation and transport can be performed without being affected by the meteorological conditions.

Finally, the considerable advantages should be mentioned which are obtained by the use of the same control room both for assembly, preparation, monitoring and launching of the rocket. An inexpensive solution is hereby obtained, avoiding communication problems which can easily arise, both between computers and other technical equipment, and between the control personnel.

The above description of a preferred embodiment does not take into consideration the location at which the rocket is transferred from the vessel to the floating structure. Both the vessel and the floating structure are designed in such a manner that they can store the complete rocket for some time, since both will be equipped with the necessary connection facilities for monitoring the rocket's and the satellite's technical systems from the ship's control room. Thus it is possible, for example, either to transfer the rocket from the vessel to the floating structure while both are lying in port, or while both are located at the launching site.

In the illustrated embodiment the ship is illustrated with room for only one rocket, but it is obvious that the ship may have room for more rockets, and room for three rockets appears to be a suitable maximum number from the practical point of view.

The invention has been explained in the above with regard to a specific embodiment. However, it is clear that a number of variants are possible within the scope of the invention. For example, the invention is not dependent on how the rocket is transferred from the vessel to the floating structure. Instead of using the illustrated hoisting device the rocket can be brought up to the ship's upper deck by means of a lift, and subsequently transferred to the platform via a bridge. It is also possible to move the rocket by means of air cushion movers, these being specially suited to moving heavy equipment, if a level base is employed.

In the embodiment described the platform is described as a semi-submersible platform. However, the invention is not restricted to this type of platform, and a jack-up platform, for example, with legs which can be placed on the bottom, will also be well suited to the purpose.

In a second embodiment the hangar on the floating structure can be made vertical, thus providing the possibility of performing the final inspections and tests while the rocket is in a vertical position, and thus providing a somewhat safer basis for the start of the launch. Another possibility is to omit the entire hangar, thus obtaining a more inexpensive design. This is relevant if the platform shall be used for launching rockets of a relatively robust design, where one is less dependent on the final inspections, and less dependent on the meteorological conditions.

We claim:

1. A method comprising: assembling, preparing, transporting to a launch site, and launching a rocket having a longitudinal main axis, wherein the rocket includes a plurality of parts and a payload which shall be transported into space, and wherein the assembling, preparing and transporting are performed with the rocket's main axis extending horizontally.

2. The method according to claim 1, wherein the assembling and preparing are performed onboard a transport device to construct a completed rocket, thereafter the completed rocket, still with the rocket's main axis extending approximately, horizontally, is transferred to a floatable structure.

3. The method according to claim 2, wherein the transport device is a ship, and the floatable structure is movable.

4. The method according to claim 3, further comprising the steps of transferring the rocket from the ship to the floatable structure by bring the rocket through a port of the ship to a lifting platform, whereupon the rocket is lifted over to the floatable platform while maintaining the rocket's main axis extending approximately, horizontally.

5. The method according to claim 4, wherein the port is formed in a stem end of the ship.

6. The method according to claim 4, wherein the port is formed in a bow end of the ship.

7. The method according to claim 2, wherein the transport device is a ship with at least one covered deck, and the floatable structure is a semi-submersible platform including horizontal pontoons and vertical shafts with a deck provided on the shafts.

8. The method according to claim 7, wherein after the launching, the rocket travels in a direction away from the floatable platform, such that the rocket's trajectory is approximately 60 degrees relative to a longitudinal axis of the floatable platform's horizontal pontoons.

9. The method according to claim 2, wherein the transport device is a ship having facilities capable of simultaneously assembling, preparing and transporting plural multi-module rockets in a horizontal orientation.

10. The method according to claim 2, wherein the rocket is raised so that the rocket's main axis extends approximately vertically prior to launching the rocket.

11. The method according to claim 2, wherein after the launching, the rocket travels in a direction away from the floatable platform thus ensuring that the rocket is not over the floatable platform if an accident should occur.

* * * * *